United States Patent [19]

Tanioka et al.

[11] Patent Number: 4,804,561
[45] Date of Patent: Feb. 14, 1989

[54] PROCESS FOR PRODUCING FERROMAGNETIC METAL FINE PARTICLES

[75] Inventors: Satoshi Tanioka; Yasuyuki Nishimoto, Minamata, Yasuto Adachi, Minamata all of Japan

[73] Assignee: Chisso Corporation, Japan

[21] Appl. No.: 106,278

[22] Filed: Oct. 9, 1987

[30] Foreign Application Priority Data

Oct. 25, 1986 [JP] Japan .................................. 61-253989

[51] Int. Cl.$^4$ .......................... B05D 5/12; B05D 7/00; B22F 3/00; C04B 35/64
[52] U.S. Cl. .................................. 427/130; 252/62.55; 427/131; 427/215
[58] Field of Search .................... 427/130, 131, 215; 428/692, 403, 693, 900; 252/62.55

[56] References Cited

FOREIGN PATENT DOCUMENTS 57-29523  4/1982  Japan .
58-213804 7/1983  Japan .
59-31003  1/1984  Japan .
59-31004  4/1984  Japan .

Primary Examiner—Michael Lusignan
Attorney, Agent, or Firm—Leydig, Voit, & Mayer

[57] ABSTRACT

A process for producing ferromagnetic metal fine particles having superior magnetic characteristics, particularly, high saturation magnetization, well-balanced coercive force, having prevented sintering of particles between one another and also having superior dispersibility each particle, superior dispersibility of magnetic paints and improved corrosion resistance is provided, which process comprises adhering a compound of a metal such as Ni, etc. onto the surface of iron α-oxyhydroxide particles in water, depositing a silicon compound and an aluminum compound onto the resulting particles in alkaline water, filtering off and drying the resulting iron α-oxyhydroxide, calcining the particles in a non-reducing gas atmosphere and reducing the particles on heating.

7 Claims, 3 Drawing Sheets

1 μm

1 μm

1 μm

PROCESS FOR PRODUCING FERROMAGNETIC METAL FINE PARTICLES

BACKGROUND OF THE INVENTION

1. Field of the Invention

This invention relates to a process for producing acicular ferromagnetic metal fine particles which comprises adding a metal compound such as a metal salt to an aqueous suspension of iron α-oxyhydroxide, depositing a metal compound onto the iron α-oxyhydroxide fine particles and reducing the resulting material.

2. Description of the Related Art

Heretofore, acicular iron oxide has been mainly used as a magnetic material in the form of fine powder for magnetic recording media, but as high-performance audio cassette tape, compact video tape, etc. have been developed, it has been required to make the density of recording higher and also to increase the performance higher. Thus, while the magnetic characteristics of such tapes each have an adequate characteristic range balanced with magnetic head, it is indispensable that the coercive force (Hc), induction (remanent induction (Br)) and relative squareness (Br/Bm) are made as high as possible, respectively. As materials which can meet these characteristics, metal fine particles of a high coercive force (Hc) and a high saturation magnetization (σs), obtained by heat-reducing powder composed mainly of iron oxide or iron α-oxyhydroxide in a stream of a reducing gas such as hydrogen gas have come to be used. Moreover, in order to correspond to the requirements of making the density of recording and the performance higher, the tendency is to make the ferromagnetic metal powder of still finer particles. However, when the powder is made of finer particles, sintering of the particles between one another in the calcination process and the reduction process at the time of its production is more likely to occur, and further the outer shape-retainability of metal particles of original shape of the iron α-hydroxide particles as the raw material become inferior. In order to achieve high dispersion of fine particle powder at the time of preparing magnetic paints and thereby to increase the density and performance of the recording of tapes, dispersibility of each particle is required to be higher than conventional dispersibility. Further, even if sintering is prevented and the outer shape of original particles is retained, the most important saturation magnetization in the aspect of magnetic characteristics diminishes as the particles are made finer, and also the coercive force becomes higher than a necessary value, beyond its adequate range, and further it is difficult to erase it by magnetic head. Still further, corrosion resistance which is one of the largest drawbacks of ferromagnetic metal powder is further decreased. Namely, when the particles are made finer, various problems arise with respect to the dispersibility, saturation magnetization, coercive force, corrosion resistance, etc. of ferromagnetic metal powder.

The first problem among the above-mentioned ones, that is, prevention of sintering of particles between one another has been solved according to the process disclosed in Japanese patent No. 1268089 (Japanese patent publication No. Sho 59-47004/1984). This patent discloses a process for producing acicular metal fine particles by adding a metal salt to an aqueous suspension of iron α-oxyhydroxide, depositing a metal compound onto the resulting iron α-oxyhydroxide and then reducing the resulting material, which process comprises adding an organic acid to the above-mentioned aqueous suspension of iron α-oxyhydroxide to make the pH 4.0 or less, followed by adding a metal salt, then adding ammonia to prepare a slurry having a pH of 9.0 to 11.0, maturing this slurry at a temperature of 70° C. or higher, thereafter adding an aqueous solution of silicic acid, further, adding ammonia if necessary, separating the resulting slurry by filtering means or the like, drying it to obtain dry iron α-oxyhydroxide, and reducing it. However, in order to overcome the difficultly of high dispersion of fine particles at the time of preparing magnetic paints therefrom by making the particles finer, a further dispersion of each particle is required, as described above. Namely, it has become impossible to sufficiently satisfy the above-mentioned requirement only by the countermeasure of the above patent in the aspect of dispersibility.

In order to solve the individual problems directed to dispersibility, saturation magnetization, coercive force, corrosion resistance, etc., a number of proposals have so far been made, but no process has yet been found which solves these problems at the same time and satisfies superior characteristics with a good balance. In particular, according to conventional processes, there occurs notable reduction in the dispersibility of magnetic paints as the particles are made finer.

SUMMARY OF THE INVENTION

The object of the pesent invention is to provide a process for producing ferromagnetic metal fine powder having superior magnetic characteristics, particularly, high saturation magnetization, well-balanced coercive force, having prevented sintering of particles between one another and also having superior dispersibility of each particle, superior dispersibility of magnetic paints and improved corrosion resistance.

The present invention resides in:

a process for producing ferromagnetic metal fine particles which comprises adhering a compound of at least one metal selected from the group consisting of Ni, Ca, Mn, Co, Mg, Ti, Cu, Sn, Bi and Cr, onto the surface of iron o-oxyhydroxide particles in water, thereafter depositing a silicon compound and an aluminum compound onto the resulting particles in alkaline water, filtering off and drying the resulting iron α-oxyhydroxide particles subjected to adhesion and deposition treatments, calcining the resulting particles in a non-reducing gas atmosphere and then reducing the clacined particles on heating.

DETAILED DESCRIPTION OF PREFERRED EMBODIMENTS

Figure 1:
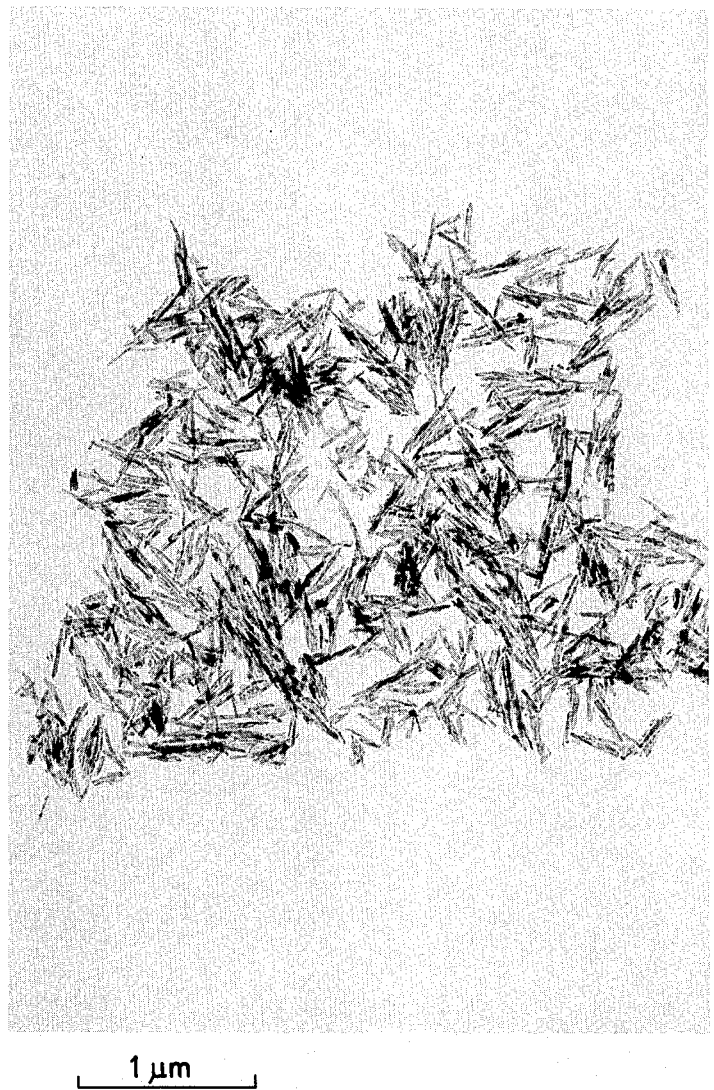
FIG. 1 shows a photograph under a transmission electron microscope (TEM) of a magnetic powder obtained in Example 1.

In order to adhere a metal compound onto the surface of iron α-oxyhydroxide particles in water in the above-mentioned process, an aqueous suspension of iron α-oxyhydroxide particles is first prepared. The water of the aqueous suspension is preferred to be an aqueous solution of an organic acid having a pH of 4.0 or less, preferably 3.5 to 2.0. In order to prepare the suspension of the aqueous solution of an organic acid of iron α- oxyhydroxide particles, an organic acid may be added to an aqueous suspension of iron α-oxyhydroxide particles or iron α-oxyhydroxide particles may be added to an aqueous solution of an organic acid.

In the above-mentioned pH range, iron α-oxyhydroxide particles having been in the form of an aggregation are uniformly dispersed into each particle. As the above organic acid, acetic acid, formic acid, citric acid, oxalic acid, etc. may be used, but among these, acetic acid is preferred in the aspct of capability of dispersing iron α-oxyhydroxide particles.

Next, an inorganic salt or an organic salt of said metal is added to the aqueous suspension of iron α-oxyhydroxide, followed by adding a basic substance to the mixture to make the suspension alkaline. The alkalinity is preferably adjusted to a pH of 9.0 or more, more preferably 9.5 to 11. Thereby an oxide or hydroxide of the above metal is deposited onto the surface of the iron α-oxyhydroxide particles.

As the above metal, at least one of Ni, Ca, Mn, Co, Mg, Ti, Cu, Sn, Bi and Cr may be employed. Among these metals, Ni is preferred since a synergistic effect is observed in combination thereof with silicon and aluminum as other adhered elements, in the aspect of any of improvement in the dispersibility of ferromagnetic metal fine particles, high saturation magnetization, control of coercive force, imparting of corrosion resistance thereto, etc. which are sought in the present invention.

Further, as the salt of the metal, sulfate, nitrate, chloride, acetate, oxalate, etc. may be employed, but among these, acetate is particularly preferred.

The amount of the metal salt used is preferred to be in the range of 1 to 30 parts by weight of the metal atom per 100 parts by weight of iron atom of iron α-oxyhydroxide, on the basis of the amount of the metal adhered.

As the above-mentioned basic substance, ammonia, sodium hydroxide, sodium carbonate, etc. may be used, and among these, ammonia is preferred since it does not require any subsequent water-washing and removing steps. As to addition of ammonia, any manner may be employed such as addition in the form of ammonia water, blowing of ammonia gas, etc., and it may be added so that the pH of the suspension can be preferably in the range of 9.0 to 11.0. In place of ammonia, a substance such as urea which is thermally decomposed to generate ammonia as an aqueous solution may also be used.

After addition of the above metal salts, the resulting suspension is matured by heating or boiling to firmly adhere the above metal compounds (oxides or hydroxides) onto the surface of iron α-oxyhydroxide particles. At that time, the temperature of the suspension is preferably 70° C. or higher, more preferably 90° C. or higher. Further, the maturation temperature is in the range of 30 minutes to 2 hours, preferably 1 to 2 hours.

Next, while the suspension is cooled or kept at 70° C. or higher, preferably 90° C. or higher, the pH of the suspension is kept at 7.0 or higher by adding a basic substance, preferably ammonia as occasion demands, and an aqueous solution of silicic acid or a silicate and an aqueous solution of aluminum salt, or alumina sol are gradually added. As to the adding manner, the aqueous solution of silicic acid or a silicate may be added in advance, or the aqueous solution of aluminum salt, or the alumina sol may be added in advance, or the both may be added at the same time. When they are added to the cooled suspension, it is preferred to heat the suspensicn up to 70° C. or higher, preferably 90° C. or higher and mature it. The maturing period is preferably in the range of 30 minutes to 2 hours, more preferably 1 to 2 hours.

Examples of the aqueous solution of silicic acid or silicate are aqueous solutions of various kinds of silicic acid such as orthosilicic acid, metasilicic acid, etc., silica sol, silica sol stabilized with ammonia, silica sol modified with aluminum, aqueous solutions of silicates, etc. The quantity of silicon used in these solutions or soles is preferably 0.5 to 7 parts by weight, more preferably 0.7 to 5 parts by weight based on the silicon atoms deposited onto 100 parts by weight of iron atoms of iron α-oxyhydroxide.

As the aqueous solution of aluminum salts or alumina sol, inorganic salts such as aluminum sulfate, aluminum chloride, aluminum nitrate, aluminum phosphate, sodium aluminate, etc., organic acid salts such as aluminum formate, aluminum acetate, aluminum lactate, etc., alumina sol, etc. may be used. The amount of aluminum used in these aqueous solutions or sol is preferably in the range of 0.5 to 7 parts by weight, more preferably 0.7 to 5 parts by weight based on the aluminum atoms adhered onto 100 parts by weights of iron atoms of iron α-oxyhydroxide. The deposition of aluminum compounds scarcely has the effectiveness of preventing particles from sintering, but due to the synergistic effect of the three-component system of Ni-Si-Al, a notable effectiveness is observed in the aspect of improving the powder dispersibility and the paint dispersibility.

In addition, when an aqueous solution of silicic acid or silicate and that of aluminum salt or alumina sol are added, the pH of the suspension is preferably 7.0 or higher, more preferably 8.0 to 11.0

As to the addition order of nickel salt, silicic acid or silicate and aluminum salt or alumina sol, it is indispensable to first add nickel salt and adhere nickel compound. If the nickel compound is adhered onto other adhesion layers or other deposition layers than the innermost layer, the dispersibility of the resulting ferromagnetic particle powder is notably reduced. This is because nickel itself has no effectiveness of preventing particles from sintering between one another.

After nickel salt has been first added, even when silicic acid or silicate and aluminum salt or alumina sol are simultaneously added or either one of them is added and the other is successively added, no difference of effectiveness is observed between both the addition manners.

The resulting suspension obtained by adding an aqueous solution of silicic acid or silicate and an aqueous solution of aluminum salt or alumina sol as described above, is separated by filtering means or the like, followed by washing with water if necessary and drying to obtain iron α-oxyhydroxide. The drying temperature is preferred to be in the range of 100° to 180° C.

In order to fully exhibit the specific features of the present invention, it is indispensable to first calcine iron α-oxyhydroxide having a metal compound, a silicon compound and an aluminum compound adhered and deposited thereonto as described below, followed by reduction. Namely, dry iron α-oxyhydroxide having a metal compound, a silicon compound and an aluminum compound adhered and deposited thereonto is dehydrated on heating to once form hematite in the form of acicular crystals. It is important to remove voids formed by the dehydration reaction to thereby make the inside of particles dense and also retain the outer shape of the particles of iron α-oxyhydroxide. Thus, the above dry iron α-oxyhydroxide is treated at 450° to 850° C. in a non-reducing gas atmosphere such as argon, nitrogen, air, etc. Under such adequate calcination conditions, while sintering of particles between one another is inhibited and the outer shape of the particles is retained, dehydration and pore-sealing are promoted, whereby it is possible to obtain dense hematite particles in the form of acicular crystals free of voids. When the respective compounds of a metal such as nickel, silicon and aluminum adhered and deposited onto the iron α-oxyhydroxide are heated, a tough and integral film is formed, and it is presumed that this film functions as an agent for preventing particles from sintering between one another and also as an agent for retaining the outer shape of the particles of iron α-oxyhydroxide. The calcination conditions, particularly temperature, are determined by the size, acicular ratio and specific surface area of iron α-oxyhydroxide, the amounts of the above metals adhered and deposited, etc.

If this calcination step is omitted, voids remain inside the particles. This is undesirable magnetically i.e. in the aspect of coercive force, and also magnetic poles generate around the voids which attract other particles thereto; hence it is impossible to obtain highly dispersed ferromagnetic metal fine particles to thereby notably reduce the paint dispersibility which is greatest characteristic of the present invention.

Reduction after the calcination is usually carried out at a temperature of 400° to 600° C. in hydrogen stream.

As to the iron α-oxyhydroxide used as a starting raw material in the present invention, if other metals such as Co, Mn, Ni, Zn, Cr, Cu, Si, etc. are doped, the particle shape of acicular iron α-oxyhydroxide, particularly branching and the acicular ratio vary; hence such doping is generally undesirable particularly in the aspect of controlling the dispersibility and coercive force, when it is aimed to obtain various characteristics which are balanced as a whole in the present invention. Ferromagnetic metal powder, particularly, fine particle powder thereof exhibits a tendency that its coercive force exceeds its proper range required in the aspect of its balance with magnetic head. In such a situation, when a nickel salt is used in the above-mentioned adhesion process, since Ni metal has an effectiveness of inhibiting coercive force, it is possible to control the force within the proper range. In the case of nickel dope, the acicular ratio of the acicular iron α-oxyhydroxide becomes notably high and the coercive force of the resulting ferromagnetic metal powder amounts to 1,800 to 2,000 Oe far beyond its adequate range, which is far from utility. Further, in the case of a three-component system of Ni-Si-Al consisting of doped nickel, Si compound and Al compound deposited according to the above-mentioned treatment process, the synergistic effect of dispersibility of nickel component is not observed as in the case of the three-component system of Ni, Si and Al adhered and deposited according to the present invention. Thus, it is undesired to use iron α-oxyhydroxide with a nickel dope, as a starting raw material.

According to the process of the present invention, a Ni compound is first adhered onto iron α-oxyhydroxide particles, and then a Si compound and an Al compound are uniformly deposited onto the resulting outer layer. The above-mentioned adhered and deposited compounds will hereinafter be briefly expressed by Ni, Si and Al, and the function and effectiveness observed from the viewpoint of the physical properties of ferromagnetic powder after reduction obtained according to the present invention will be described.

As to the effectiveness of adhesion or deposition of the respective components, Ni has no sintering resistance. Si has a marked effectiveness of sintering resistance and also has a shape-retainability of each particle according to the observation results under a transmission electron microscope (hereinafter referred to as TEM), but a bundle form or aggregate is observed between particles, and the reduction temperature is not only high, but also the range of the proper reduction temperature is narrow, and if the temperature is even somewhat too high, each particle melts and exhibits roundness. Al has a sintering resistance unlike Ni, but this resistance is far inferior to that of Si; hence it can be said that Al has practically no sintering resistance.

As to two-component systems, Ni-Al system is inferior in the sintering resistance and the shape-retainability and hence practically useless. Si-Al system has all the same effectiveness as in the case of Si alone; hence no synergistic effect due to the composite system is observed. In addition, as to Si and Si-Al system, even when the reduction temperature is raised, no high saturation magnetization is obtained and rise in the coercive force due to making particles finer is great. As to Ni-Si system, even when the reduction temperature is lowered, a high saturation magnetization is easily obtained and easily reducible as compared with Si and Si-Al systems, and also a phenomenon is not observed that each particle melts in a broad reduction temperature range and exhibits roundness. An effectiveness of inhibiting the coercive force is also exhibited and a specific feature above all is that the dispersibility of magnetic powder observed under TEM is improved, that is each particle is dispersed and a phenomenon of bundle form or aggregation is not observed. In fact, improvement in the dispersibility on tapes (relative squareness Rs=(Remanent Induction)/(Saturation Induction)) is also notable. These phenomena are regarded to be due to the synergistic effect of Ni-Si.

Further, with regard to the three-component system of Ni-Si-Al, this system supplementally overcomes all the drawbacks of the Si-Al system and more improves the powder dispersibility observed under TEM and the dispersibility on the tapes as compared with Ni-Si system. This is evidently due to the effectiveness of Al in the three-component system. Moreover, other characteristics of Ni-Si system are all taken over. In view of these facts, effectiveness beyond that anticipated from the characteristics of the respective elements and the combinations thereof in the one-component systems and the two-component systems is observed in the three-component system of the present invention, and improvement in the dispersibility, the high saturation magnetization and control of the coercive force are achieved with a good balance, and further, in the case of Ni-containing (adhered) three-component system, corrosion resistance is also evidently improved.

The object of the present invention has been achieved with the three-component system for the first time, and even when either one of the components is deficient, the above-mentioned effectiveness is not exhibited or reduced.

The present invention will be described in more detail by way of Examples. In the following Examples and Comparative examples, "%" refers to % by weight unless otherwise indicated.

EXAMPLE 1

A wet cake of iron α-oxyhydroxide (1,000 g on dry basis) was introduced into purified water (20 l) to obtain an aqueous suspension of iron α-oxyhydroxide, followed by adding acetic acid (purity: 99.5%) (35 ml) to make its pH 3.30 (at 20° C.). The viscosity of the abovementioned suspension rapidly reduced down to several cPs. The resulting suspension was agitated for 30 minutes, followed by gradually adding thereto an aqueous solution of nickel acetate prepared in advance by dissolving nickel acetate [$(CH_3COO)_2Ni.4H_2O$; purity 97%; Ni content 22.9%] (265 g) in water (1.5 l), further agitating the mixture for 30 minutes, thereafter adding 28% aqueous ammonia (200 ml) to make its pH 9.60 (at 20° C.), thereafter continuing agitation for 30 minutes, raising the temperature up to 90° C., maturing the resulting suspension for 60 minutes, again adding thereto 28% aqueous ammonia to make its pH 9.3, gradually adding to the resulting suspension, an aqueous solution of orthosilicic acid (Si concentration: 1%) (1,570 g), while keeping the suspension at the above maturing temperature, agitating the mixture for 60 minutes, further gradually adding thereto a separately prepared aqueous solution of aluminum sulfate [$Al(SO_4)_3.14H_2O$] (Al concentration: 2%) (375 g), sufficiently agitating the mixture, maturing it at 90° C. for 60 minutes, cooling it down to 30° C. to obtain a suspension of iron α-oxyhydroxide having Ni-Si-Al adhered and deposited thereonto, and filtering off this suspension, drying the resulting cake at 130° to 135° C. overnight to obtain a treated dry iron a-oxyhydroxide as shown in Table 1.

This dry iron α-oxyhydroxide (900 g) was first calcined in $N_2$ atmosphere at 600° C. for 30 minutes, followed by reducing the resulting material at a temperature indicated in Table 1 for 12 hours in a flow amount of $H_2$ of 30 l/min., withdrawing the reduced material into toluene and air-drying it at 20° C. in a constant temperature room at a relative humidity of 60% for 24 hours to obtain dried ferromagnetic metal fine powder.

This product was observed under a transmission electron microscope (TEM). Its specific surface area value and magnetic characteristic value at a magnetic field of 10 KOe are shown in the column of characteristic of magnetic metal powder of Table 1.

Further, the powder (55 g), a binder (12.4 g) consisting of chlorinated vinyl acetate and a polyurethane, a curing agent (0.7 g), an abrasive agent (3.8 g), a dispersing agent (2.8 g) and a solvent (171 g) consisting of toluene, methyl ethyl ketone, methyl isobutyl ketone and cyclohexanone were together fed in a sand mill and agitated at 1,850 evolutions per minute for 2 hours to obtain a magnetic paint. This paint was oriented on a polyester film in a magnetic field of 3,000 Gauses to prepare a tape. The magnetic characteristics of this tape were measured in a magnetic field of 5 KOe. Further, this tape was exposed to an atmosphere of 50° C. and a relative humidity of 90% for one week, and the percentage reduction of saturation induction was expressed in terms of corrosion resistance. These measurement results are shown in the column of magnetic characteristics of tape of Table 1. Magnetic characteristics were similarly measured in the following Examples and Comparative examples.

EXAMPLES 2 and 3

The same treatment as in Example 1 was carried out except that the aqueous solution of aluminum sulfate was replaced by an aqueous solution of sodium aluminate or an aqueous solution of aluminum formate, each in an amount of the same aluminum equivalent as that of Example 1, to obtain two kinds of ferromagnetic metal fine powder. Their characteristic values were measured. The results are shown in Table 1.

EXAMPLE 4

The same treatment as in Example 1 was carried out except that the addition order of the aqueous solution of orthosilicic acid and the aqueous solution of aluminum sulfate was reversed, to obtain ferromagnetic metal fine powder. Its characteristic values were measured. The results are shown in Table 1.

EXAMPLE 5

The same treatment as in Example 4 was carried out except that the aqueous solution of orthosilicic acid was replaced by an aqueous solution of sodium silicate and the aqueous solution of aluminum sulfate was replaced by an aqueous solution of sodium aluminate, to obtain ferromagnetic metal fine powder. Its characteristic values were measured. The results are shown in Table 1.

COMPARATIVE EXAMPLES 1 and 2

All the same treatment as in Examples 1 and 5 was carried out except that no calcination was carried out, to obtain two kinds of ferromagnetic metal fine powder. Their characteristic values were measured. The results are shown in Table 1.

COMPARATIVE EXAMPLE 3

The same treatment as in Example 1 was carried out except that iron α-oxyhydroxide containing nickel in a quantity of 5.24% by weight based on the weight of iron atoms in iron o-oxyhydroxide was used and the aqueous solution of nickel acetate was not added, to obtain ferromagnetic metal fine powder. Its characteristic values are shown in Table 1.

COMPARATIVE EXAMPLE 4

A wet cake of iron α-oxyhydroxide (1,000 g on the dry basis) was introduced into purified water (20 l) to obtain an aqueous suspension of iron α-oxyhydroxide, followed by adding thereto acetic acid (35 ml) to make its pH 3.30 (at 20° C.). The viscosity of the suspension rapidly reduced down to several cPs. An aqueous solution of aluminum sulfate (375 g) prepared in advance was gradually added to the suspension, followed by further agitating the mixture for 30 minutes, successively gradually adding a separately prepared aqueous solution of nickel acetate obtained by dissolving nickel acetate (265 g) in water (1.5 l), agitating the mixture for 30 minutes, adding to the resulting suspension, 28% aqueous ammonia (260 ml) to make its pH 9.50 (at 20° C.), thereafter continuing agitation for 30 minutes, raising the temperature up to 90° C., maturing the resulting material for 60 minutes, again adding to the resulting suspension, 28% aqueous ammonia to make its pH 9.2, gradually adding to the resulting suspension, an aqueous solution of orthosilicic acid (1,570 g), while keeping the suspension at the abovementioned mature temperature, agitating the mixture for 60 minutes, thereafter cooling it, filtering off the suspension, and carrying out the subsequent treatment in the same manner as in Example 1 to obtain ferromagnetic metal fine powder. Its characteristic values were measured. The results are shown in Table 1.

COMPARATIVE EXAMPLE 5

The same treatment as in Example 1 was carried out except that the aqueous solution of aluminum sulfate was not added, to obtain ferromagnetic metal fine powder. Its characteristic values were measured. The results are shown in Table 1.

COMPARATIVE EXAMPLE 6

The same treatment as in Comparative example 5 was carried out except that the aqueous solution of orthosilicic acid (2,200 g) was used to obtain ferromagnetic metal fine powder. Its characteristic values were measured. The results are shown in Table 1.

COMPARATIVE EXAMPLE 7

The same treatment as in Example 1 was carried out except that no aqueous solution of orthosilicic acid was added and the aqueous solution of aluminum sulfate (852 g) was added to obtain ferromagnetic metal fine powder. Its characteristic values were measured. The results are shown in Table 1.

COMPARATIVE EXAMPLE 8

The same treatment as in Comparative example 7 was carried out except that the aqueous solution of aluminum sulfate (1,136 g) was used to obtain ferromagnetic metal fine powder. Its characteristic values were measured. The results are shown in Table 1.

COMPARATIVE EXAMPLE 9

The same treatment as in Example 1 were carried out except that no aqueous solution of nickel acetate was added to obtain ferromagnetic metal fine powder. Its characteristic values were measured. The results are shown in Table 1.

COMPARATIVE EXAMPLE 10

The same treatment as in Comparative example 9 was carried out except that the addition order of the aqueous solution of orthosilicic acid and the aqueous solution of aluminum sulfate was reversed, to obtain ferromagnetic metal fine powder. Its characteristic values were measured. The results are shown in Table 1.

COMPARATIVE EXAMPLE 11

The same treatment as in Comparative example 10 was carried out except that the aqueous solution of orthosilicic acid was replaced by an aqueous solution of sodium silicate and the aqueous solution of aluminum sulfate was replaced by an aqueous solution of sodium aluminate to obtain ferromagnetic metal fine powder. Its characteristic values were measured. The results are shown in Table 1.

COMPARATIVE EXAMPLE 12

The same treatment as in Example 1 was carried out except that the aqueous solution of nickel acetate and that of aluminum sulfate were both not added, to obtain ferromagnetic metal fine powder. Its characteristic values were measured. The results are shown in Table 1.

COMPARATIVE EXAMPLE 13

The same treatment as in Comparative example 12 was carried out except that the aqueous solution of orthosilicic acid (2,200 g) was used to obtain ferromagnetic metal fine powder. Its characteristic values were measured. The results are shown in Table 1.

Figure 2:
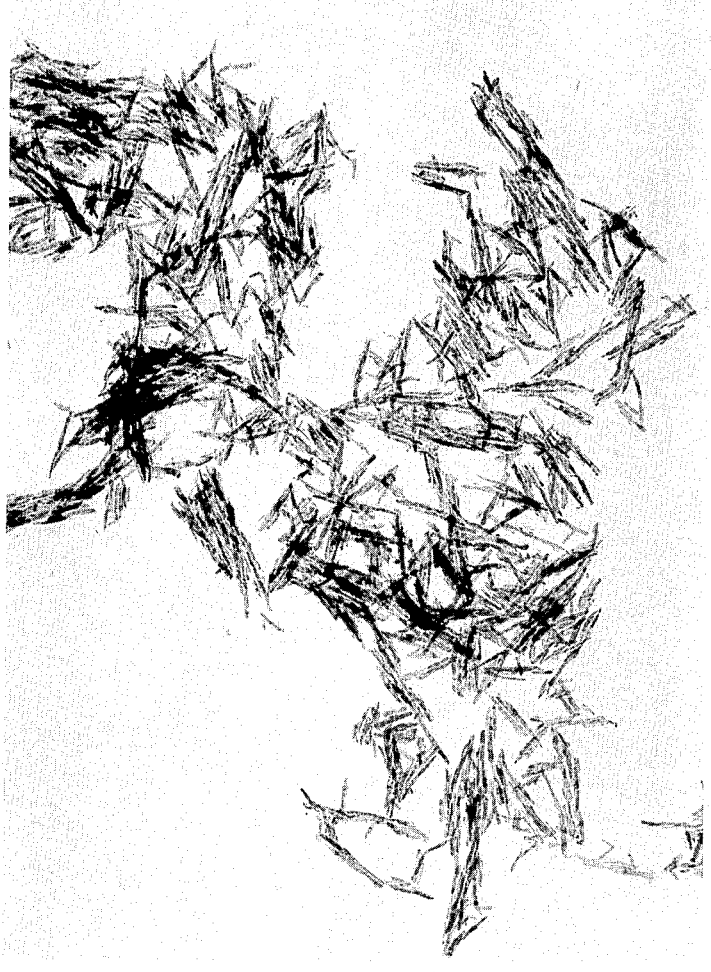
FIG. 2 shows that obtained in Comparative example 6 and FIG. 3 shows that obtained in Comparative example 9.
Figure 3:
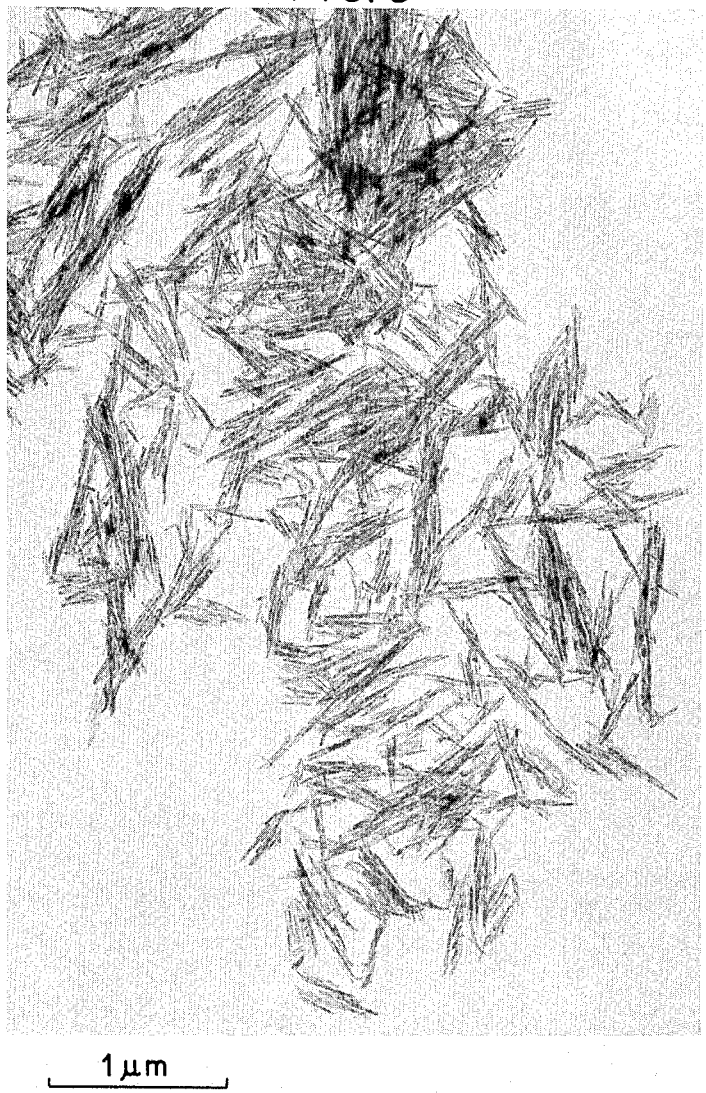

In addition, the photographs under a transmission electron microscope (TEM), of the respective kinds of magnetic powder obtained in Example 1, Comparative example 6 and Comparative example 9 are shown in FIGS. 1, 2 and 3. It is evident from these figures that the TEM dispersibility lowers in the above-mentioned order and bundle-form or aggregate particles increase.

TABLE 1

| | Adhesion amount[1] | | | Adhesion source[2] | | Adhesion order | Calcination | Reduction temp. (°C.) | Characteristics of magnetic metal powder[5] | | |
|---|---|---|---|---|---|---|---|---|---|---|---|
| | Ni (%) | Si (%) | Al (%) | Si source (kind) | Al source (kind) | | | | TEM[3] dispersibility | Specific surface area (m²/g) | Coercive force (Oe) |
| Ex. 1 | 9.50 | 2.43 | 1.16 | Orthosilicic acid | Aluminum sulfate | Ni—Si—Al | Yes | 500 | ◉ | 52.8 | 1500 |
| Ex. 2 | 9.17 | 2.56 | 1.14 | Orthosilicic acid | Sodium aluminate | Ni—Si—Al | " | 510 | ◉ | 53.7 | 1517 |
| Ex. 3 | 9.52 | 2.41 | 1.10 | Orthosilicic acid | Aluminum formate | Ni—Si—Al | " | 500 | ◉ | 52.0 | 1507 |
| Ex. 4 | 9.36 | 2.42 | 1.07 | Orthosilicic acid | Aluminum sulfate | Ni—Al—Si | " | " | ◉ | 53.1 | 1514 |
| Ex. 5 | 9.18 | 2.54 | 1.15 | Sodium silicate | Sodium aluminate | Ni—Al—Si | " | 510 | ◉ | 53.5 | 1501 |
| Comp. ex. 1 | 9.50 | 2.43 | 1.16 | Orthosilicic acid | Aluminum sulfate | Ni—Si—Al | None | 500 | Δ | 49.8 | 1441 |
| Comp. ex. 2 | 9.18 | 2.54 | 1.15 | Sodium silicate | Sodium aluminate | Ni—Al—Si | " | 510 | Δ | 50.0 | 1471 |
| Comp. ex. 3 | 5.24 | 2.52 | 1.14 | Orthosilicic acid | Aluminum sulfate | (Ni dope)—Si—Al | Yes | 520 | ○ | 46.2 | 1868 |
| Comp. ex. 4 | 9.17 | 2.44 | 1.09 | Orthosilicic acid | Aluminum sulfate | Al—Ni—Si | " | 500 | Δ | 50.6 | 1438 |
| Comp. ex. 5 | 9.04 | 2.42 | — | Orthosilicic acid | — | Ni—Si | " | 430 | ○ | 47.0 | 1450 |
| Comp. ex. 6 | 9.36 | 3.41 | — | Orthosilicic acid | — | Ni—Si | " | 470 | ○ | 49.0 | 1531 |
| Comp. ex. 7 | 9.69 | — | 2.47 | — | Aluminum sulfate | Ni—Al | " | 380 | x | 33.7 | 965 |
| Comp. ex. 8 | 9.15 | — | 3.56 | — | Aluminum sulfate | Ni—Al | " | 410 | x | 40.4 | 992 |
| Comp. | — | 2.50 | 1.09 | Orthosilicic | Aluminum | Si—Al | " | 530 | Δ | 49.1 | 1544 |

TABLE 1-continued

| | | | | | | | | | | |
|---|---|---|---|---|---|---|---|---|---|---|
| ex. 9 | — | | | acid | sulfate | | | | | |
| Comp. ex. 10 | — | 2.47 | 1.11 | Orthosilicic acid | Aluminum sulfate | Al—Si | " | " | Δ | 48.4 | 1553 |
| Comp. ex. 11 | — | 2.48 | 1.16 | Sodium silicate | Sodium aluminate | Al—Si | " | 540 | Δ | 48.2 | 1523 |
| Comp. ex. 12 | — | 2.40 | — | Orthosilicic acid | — | Si | " | 450 | Δ | 44.5 | 1479 |
| Comp. ex. 13 | — | 3.48 | — | Orthosilicic acid | — | Si | " | 490 | Δ | 47.4 | 1576 |

| | Characteristics of magnetic metal powder[5] | | Magnetic characteristics of tape[5] | | | | |
|---|---|---|---|---|---|---|---|
| | Saturation magnetization (emu/g) | Relative squareness (—) | Coercive force (Oe) | Remanent induction (G) | Relative squareness (—) | Corrosion[4] resistance (%) |
| Ex. 1 | 139 | 0.506 | 1509 | 2210 | 0.821 | −7.8 |
| Ex. 2 | 137 | 0.515 | 1520 | 2190 | 0.818 | −8.5 |
| Ex. 3 | 137 | 0.511 | 1515 | 2080 | 0.810 | −9.1 |
| Ex. 4 | 136 | 0.509 | 1516 | 2200 | 0.823 | −7.7 |
| Ex. 5 | 138 | 0.519 | 1510 | 2160 | 0.819 | −7.0 |
| Comp. ex. 1 | 131 | 0.487 | — | — | — | — |
| Comp. ex. 2 | 132 | 0.494 | — | — | — | — |
| Comp. ex. 3 | 130 | 0.526 | 1980 | 1610 | 0.753 | −9.5 |
| Comp. ex. 4 | 136 | 0.499 | — | — | — | — |
| Comp. ex. 5 | 145 | 0.504 | 1471 | 2010 | 0.793 | −9.3 |
| Comp. ex. 6 | 141 | 0.510 | 1551 | 1860 | 0.801 | −8.4 |
| Comp. ex. 7 | 137 | 0.418 | — | — | — | — |
| Comp. ex. 8 | 140 | 0.420 | — | — | — | — |
| Comp. ex. 9 | 125 | 0.539 | 1575 | 1770 | 0.781 | −13.5 |
| Comp. ex. 10 | 128 | 0.530 | 1588 | 1710 | 0.789 | −12.8 |
| Comp. ex. 11 | 123 | 0.502 | 1533 | 1820 | 0.780 | −12.0 |
| Comp. ex. 12 | 130 | 0.503 | 1501 | 1830 | 0.764 | −11.0 |
| Comp. ex. 13 | 124 | 0.522 | 1594 | 1810 | 0.792 | −13.9 |

Remarks in Table 1:
[1]% by weight of the respective atoms based on the weight of iron atoms of iron α-oxyhydroxide
[2]Nickel acetate was used as the nickel source.
[3]Dispersion degree of particles observed under TEM. (Superior) ◉ > ○ > Δ > x (Inferior)
[4]Percentage reduction of saturation induction after exposure of tape at 50° C., 90% RH and for one week.
[5]Magnetic characteristics: Powder was measured at 10 KOe and tape was measured at 5 KOe.

What we claim is:

1. A process for producing ferromagnetic metal fine particles which comprises:
    an adhering step of adhering an effective amount of a compound of at least one metal selected from the group consisting of Ni, Ca, Mn, Co, Mg, Ti, Cu, Sn, Bi and Cr, onto the surface of iron α-oxyhydroxide particles in water;
    effective amounts of a depositing step of depositing a silicon compound and an aluminum compound onto the resulting particles in alkaline water;
    a step of filtering off and drying the resulting iron α-oxyhydroxide particles;
    a step of calcining the resulting particles in a non-reducing gas atmosphere, and then reducing the calcined particles on heating.

2. A process according to claim 1 wherein said adhering step is carried out that a salt of said at least one metal is added to a suspension of said iron α-oxyhydroxide particles in an aqueous solution of an organic acid, having a pH of 4.0 or less, followed by adding ammonia to the resulting suspension to make the pH of the suspension 9 to 11, and then maturing the resulting suspension at a temperature of 70° C. or higher to thereby adhere said compound of at least one metal onto the surface of iron α-oxyhydroxide particles.

3. A process according to claim 1 wherein said compound of at least one metal is a salt of nickel, which salt is at least one member selected from inorganic salts represented by sulfate, nitrate and chloride, and organic salts represented by acetate and oxalate.

4. A process according to claim 1 wherein said depositing step is carried out that an aqueous solution of silicic acid or a silicate and an aqueous solution of an aluminum salt or alumina sol are added at the same time or successively to an aqeous suspension of said adhered iron α-oxyhydroxide particles while controlling the pH of said suspension at a pH of 7 or more, and the temperature of the resulting suspension 70° C. or higher.

5. A process according to claim 4 wherein said aqueous solution of silicic acid or a silicate is at least one member selected from the group consisting of an aqueous solution of silicic acid represented by orthosilicic acid and metasilicic acid, silica sol in the form of aqueous solution, silical sol stabilized by ammonia in the form of aqueous solution, silica sol modified by aluminum in the form of aqueous solution and aqueous solution of sodium silicate.

6. A process according to claim 4 wherein said aluminum salt is at least one member selected from inorganic salts of aluminum represented by aluminum sulfate, aluminum chloride, aluminum nitrate, aluminum phosphate and sodium aluminate, and organic salts of aluminum represented by aluminum formate, aluminum acetate and aluminum lactate.

7. A process according to claim 1 wherein said step of calcination is carried out at a temperature of 450° to 850° C.

* * * * *